US008479288B2

(12) United States Patent
Martin et al.

(10) Patent No.: US 8,479,288 B2
(45) Date of Patent: Jul. 2, 2013

(54) METHOD AND SYSTEM FOR PROVIDING A HONEYPOT MODE FOR AN ELECTRONIC DEVICE

(75) Inventors: Daryl Joseph Martin, Paradise (CA); J. F. Sean Wilson, Waterloo (CA); Ahmed E. Hassan, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1227 days.

(21) Appl. No.: 11/459,053

(22) Filed: Jul. 21, 2006

(65) Prior Publication Data

US 2008/0018927 A1 Jan. 24, 2008

(51) Int. Cl.
*H04L 29/06* (2006.01)

(52) U.S. Cl.
USPC ............................................. 726/23; 380/250

(58) Field of Classification Search
USPC ...... 726/2–7, 11–14, 22, 23, 26–29; 713/187; 380/250; 358/1.13, 1.15
See application file for complete search history.

(56) References Cited

U.S. PATENT DOCUMENTS

| 5,748,084 | A | 5/1998 | Isikoff | |
|---|---|---|---|---|
| 7,532,895 | B2 * | 5/2009 | Hrastar | 726/23 |
| 7,841,009 | B1 * | 11/2010 | Smith | 726/26 |
| 8,001,583 | B2 * | 8/2011 | Waizumi et al. | 726/3 |
| 2003/0208694 | A1 | 11/2003 | Fang | |
| 2003/0219008 | A1 | 11/2003 | Hrastar | |
| 2004/0252837 | A1 * | 12/2004 | Harvey et al. | 380/270 |
| 2005/0039047 | A1 * | 2/2005 | Raikar et al. | 726/4 |
| 2005/0120242 | A1 * | 6/2005 | Mayer et al. | 713/201 |
| 2005/0166072 | A1 | 7/2005 | Converse et al. | |
| 2005/0198319 | A1 | 9/2005 | Chan et al. | |
| 2007/0039049 | A1 * | 2/2007 | Kupferman et al. | 726/22 |
| 2007/0208822 | A1 * | 9/2007 | Wang et al. | 709/217 |
| 2007/0220603 | A1 * | 9/2007 | Chamberot | 726/22 |
| 2007/0223696 | A1 * | 9/2007 | Furuyama | 380/239 |
| 2007/0234070 | A1 * | 10/2007 | Horning et al. | 713/190 |
| 2008/0034424 | A1 * | 2/2008 | Overcash et al. | 726/22 |
| 2008/0141374 | A1 * | 6/2008 | Sidiroglou et al. | 726/23 |
| 2009/0064331 | A1 * | 3/2009 | Lyle et al. | 726/22 |
| 2009/0241191 | A1 * | 9/2009 | Keromytis et al. | 726/23 |

* cited by examiner

*Primary Examiner* — Gilberto Barron, Jr.
*Assistant Examiner* — Abdulhakim Nobahar
(74) *Attorney, Agent, or Firm* — Ridout & Maybee LLP

(57) ABSTRACT

A method and system are described of providing an electronic device with a software environment having a honeypot mode of operation to which the device is capable of switching upon recognition of a message from an external device or of a pre-determined internal state. Switching to the honeypot mode of operation may include instituting an automatic sending of reports based on usage of the electronic device to an external device, modifying the non-user-observable behavior of certain user-invokable operations, and manipulating data stored on the electronic device.

35 Claims, 12 Drawing Sheets

METHOD AND SYSTEM FOR PROVIDING A HONEYPOT MODE FOR AN ELECTRONIC DEVICE

FIELD OF THE TECHNOLOGY

This disclosure relates to the security of an electronic device and more particularly to remotely monitoring the usage of such a device.

BACKGROUND

With the huge number of mobile devices currently in use, there is now an increased threat of loss or theft of devices. Thus, unauthorized physical access may come about when an unauthorized party, perhaps with no premeditated malicious intent, obtains a device. The device might be a laptop computer, a personal digital assistant (PDA), a cell phone, or a device with both data and voice communication capabilities. Even a device not considered mobile (e.g. a desktop computer) may be stolen or may be accessed by someone entering an area to which they do not have authorized access. Alternatively, the need may arise to cease authorization of a previously authorized user. In all of the aforementioned circumstances, the physical access authorization status of the device will be said to have changed from "authorized" to "unauthorized." Anyone subsequently using the device is presumed to be an unauthorized user and will be called simply "the user." This is in contrast with the term "authorized user," which will be used to denote someone who has lost or had a device stolen.

For devices whose physical access authorization status has become unauthorized, it is well known in the prior art to disable the device by means of a remote command transmitted over a network. This can also be accomplished even if the compromised device is only capable of receiving communication from a single external device, provided that device is the one that issues the command. As a result, although the user may have physical access to the device, he/she can make no practical use of it. The disabling may take a variety of forms: the device may be remotely turned off with no way to turn it on again at the device; or it may remain capable of being turned on, but the user may be unable to log-on to the network, make a phone call, etc. even if he/she uses a password that would ordinarily have granted such access to the capabilities of the device.

Such disabling does not help determine the location of the device or the identity of the unauthorized person in possession of the device if said location and/or identity are unknown. Nor does it help investigate the activities of a previously authorized user who is no longer trusted to have authorized access.

What is needed is a method and system for providing a honeypot mode of operation for an electronic device that is capable of communicating with an external device.

BRIEF DESCRIPTION OF THE DRAWINGS

Embodiments of the present application will be described, by way of example only, with reference to the accompanying drawings, in which.

DETAILED DESCRIPTION OF THE EMBODIMENTS

Figure 1:
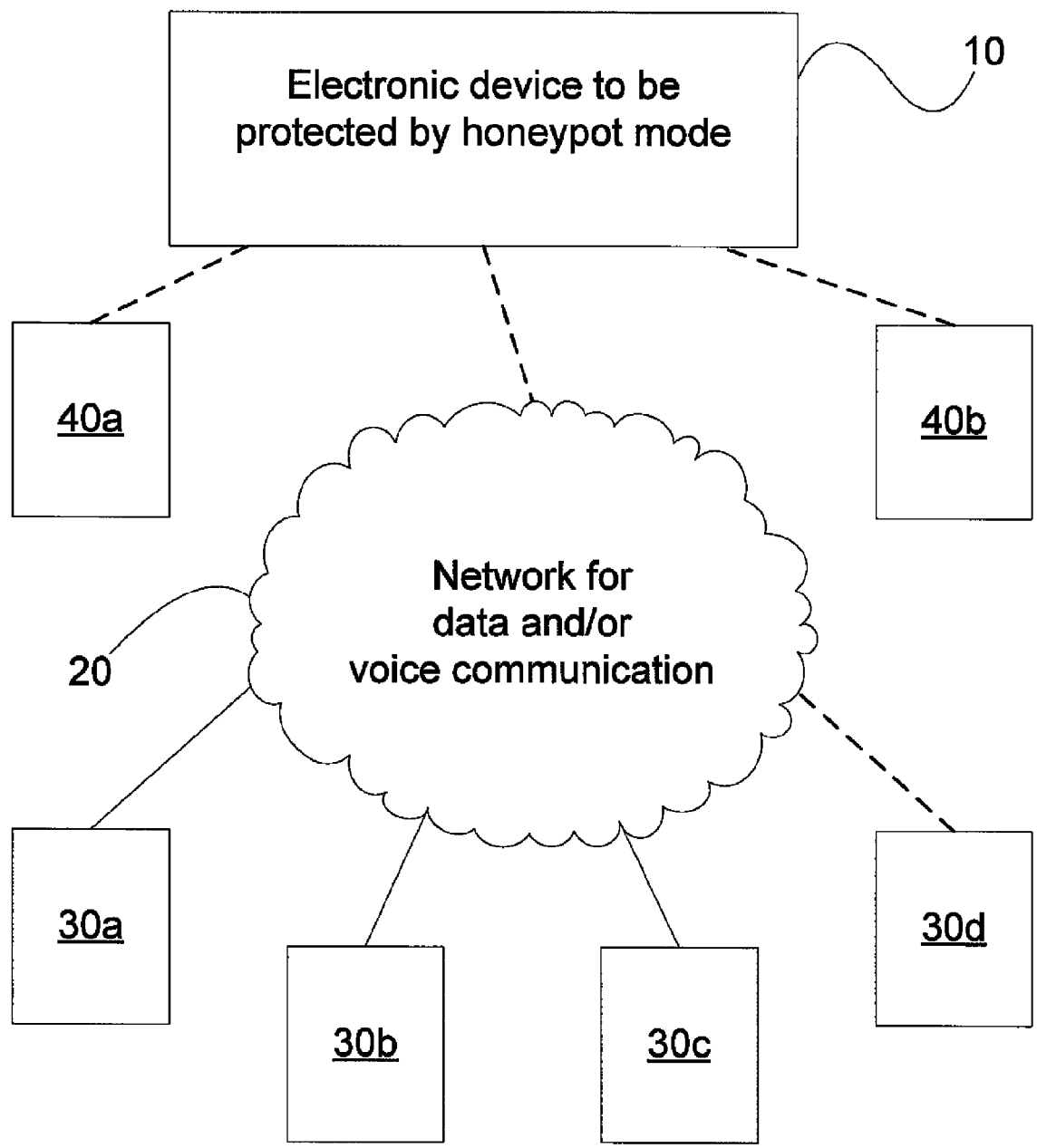
FIG. 1 is a block diagram showing a protected device, external devices, and a network through which some external devices are connected to the protected device.

In one aspect, the present application discloses a method for surreptitiously tracking usage of an electronic device, the electronic device being capable of communicating with at least one external system. The method includes a step of providing the electronic device with a software environment having a normal mode of operation and a honeypot mode of operation and with a predetermined condition, wherein, in the normal mode of operation, the software environment provides a plurality of user-invokable operations; and wherein, in the honeypot mode of operation, the software environment provides at least one of the user-invokable operations. The method also includes steps of detecting at the electronic device the predetermined condition; in response to the detection, switching the software environment to the honeypot mode of operation; and when in the honeypot mode of operation, enabling the electronic device to automatically send a non-user-detectable report regarding usage of the at least one of the user-invokable operations to a predetermined external system.

In another aspect, the present application discloses an electronic device, configured to enable surreptitious tracking of usage of the electronic device. The electronic device includes a communication subsystem for enabling communications with at least one external system and memory storing a software environment having a normal mode of operation and a honeypot mode of operation and storing a predetermined condition, wherein, in the normal mode of operation, the software environment provides a plurality of user-invokable operations, and wherein, in the honeypot mode of operation, the software environment provides at least one of the user-invokable operations. The electronic device also includes a processor for executing the software environment, and a mode-switch module for detecting the predetermined condition and, in response to the detection, switching the software environment to the honeypot mode of operation. When in the honeypot mode of operation, the software environment is adapted to automatically send a non-user-detectable report regarding usage of the at least one of the user-invokable operations to a predetermined external system.

In yet another aspect, the present application discloses a computer program product including a computer-readable medium having encoded therein computer-executable instructions for surreptitiously tracking usage of an electronic device, the electronic device being capable of communicating with at least one external system. The instructions include instructions for providing the electronic device with a software environment having a normal mode of operation and a honeypot mode of operation and with a predetermined condition, wherein in the normal mode of operation the software environment provides a plurality of user-invokable operations, and wherein in the honeypot mode of operation the software environment provides at least one of the user-invokable operations. The instructions also include instructions for detecting at the electronic device the predetermined condition; instructions for, in response to the detection, switching the software environment to the honeypot mode of operation; and instructions for, when in the honeypot mode of operation, automatically sending a non-user-detectable report regarding usage of the at least one of the user-invokable operations to a predetermined external system.

Reference is first made to FIG. 1, which diagrammatically shows an embodiment of an electronic device 10 in a network environment. The electronic device 10 is shown connected to external devices 30 (shown individually as 30a, 30b, 30c, 30d) via a network 20 designed to carry data, voice, or both voice and data traffic. The electronic device 10 is provided with both a normal mode of operation and a honeypot mode of operation, and it may be hereinafter referred to as "the protected device." The device may be capable of direct communication with external devices 40a and 40b, i.e. communication other than via the network 20.

Some connections in FIG. 1 are dashed to indicate intermittent or temporary connectivity. For example, the electronic device 10 and/or one of the external devices 30 may comprise wireless mobile devices that, at times, may not be in an area serviced by the type of network to which it can connect. In another example, the electronic device 10 and/or one of the external devices 30 may comprise a laptop computer configured for connection only to a wired network and it may, from time to time, be in transit and not connected to such a network. For yet another example, the electronic device 10 may be temporarily positioned in a "cradle" for the express purpose of being provisioned with honeypot capabilities by a nearby external device 40a or 40b over a direct, wired connection.

Figure 10:
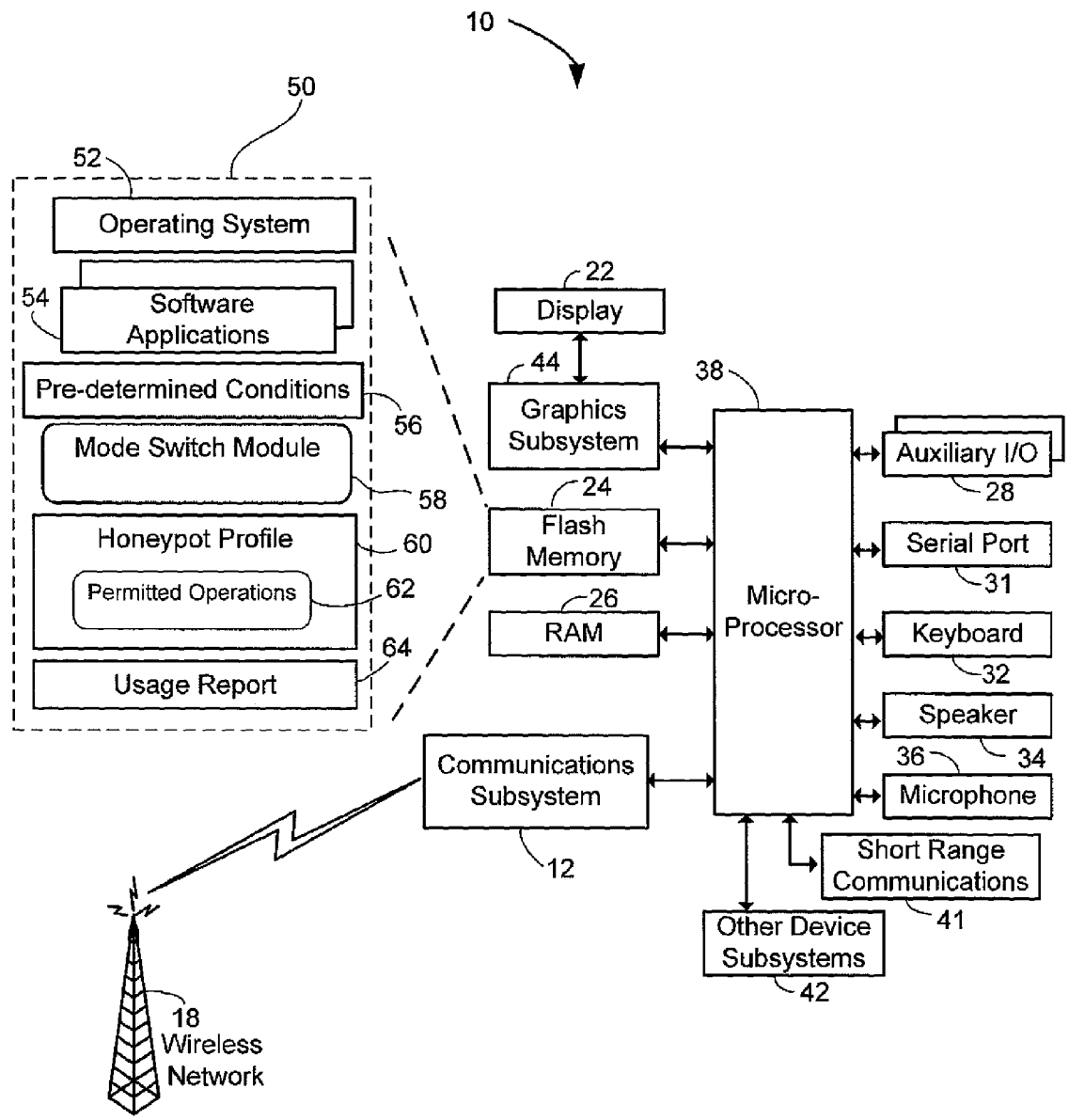
FIG. 10 shows a block diagram of an embodiment of the electronic device.

Reference is now made to FIG. 10, which shows a block diagram of an embodiment of the electronic device 10. In the example embodiment, the electronic device 10 is a two-way mobile communication device 10 having data and voice communication capabilities. Depending on the functionality provided by the device 10, in various embodiments the device 10 may be a data communication device, a multiple-mode communication device configured for both data and voice communication, a mobile telephone, a personal digital assistant (PDA) enabled for wireless communication, or a computer system with a wireless modem, among other things. In the embodiment shown in FIG. 10, the electronic device 10 communicates with a wireless network 18.

In this embodiment, the device 10 includes a communication subsystem 12. In one embodiment, the communication subsystem 12 may include a receiver, a transmitter, and associated components such as one or more, preferably embedded or internal, antenna elements, and a processing module such as a digital signal processor (DSP). As will be apparent to those skilled in the field of communications, the particular design of the communication subsystem 12 will be dependent upon the wireless network 18 in which the device 10 is intended to operate.

Signals received by the device 10 from the wireless network 18 are input to the receiver of the communication subsystem 12, which may perform such common receiver functions as signal amplification, frequency down-conversion, filtering, channel selection and the like. In a similar manner, signals to be transmitted are processed, including modulation and encoding for example, by the DSP and input to the transmitter for digital-to-analog conversion, frequency up-conversion, filtering, amplification and transmission over the wireless network 18.

The device 10 includes a microprocessor 38 that controls the overall operation of the device 10. The microprocessor 38 interacts with the communications subsystem 12 and also interacts with further device subsystems such as a graphics subsystem 44, flash memory 24, random access memory (RAM) 26, auxiliary input/output (I/O) subsystems 28, serial port 31, keyboard or keypad 32, speaker 34, microphone 36, a short-range communications subsystem 41, and any other device subsystems generally designated as 42. The graphics subsystem 44 interacts with the display 22 and renders graphics or text upon the display 22.

The electronic device 10 includes a software environment, indicated generally by reference numeral 50. The software environment 50 may, in some embodiments, include operating system 52 software that provides the basic device functions or operations. In other embodiments, the software environment 50 may include various software applications 54 for providing higher-level functions or operations. In any case, the software environment 50 provides the device 10 with a set of user-invokable operations or functions. For example, in one embodiment a user-invokable operation may include the placing of a voice call. In another embodiment, an example user-invokable operation may include composing a data message. A further example may include the sending of the composed data message. In yet a further example, a user-invokable operation may include opening a contacts list. The wide range of possible user-invokable operations will be appreciated by those of ordinary skill in the art.

The software environment 50, which in this embodiment includes the operating system 52 software and various software applications 54 may be stored in a persistent store such as flash memory 24 or a similar storage element. Those skilled in the art will appreciate that the operating system 52, software applications 54, or parts thereof, may be temporarily loaded into a volatile store such as RAM 26. It is contemplated that received communication signals may also be stored to RAM 26.

The microprocessor 38 enables execution of the operating system 52 and the software applications 54 on the device 10. A predetermined set of software applications 54 which control some basic device operations, including data and voice communication applications for example, may normally be installed on the device 10 during manufacture. Further software applications 54 may also be loaded onto the device 10 through the wireless network 18, an auxiliary I/O subsystem 28, serial port 31, short-range communications subsystem 41 or any other suitable subsystem 42, and installed by a user in the RAM 26 or a non-volatile store like flash memory 24 for execution by the microprocessor 38.

The serial port 41 may allow for direct connection communications between the electronic device 10 and another device or system. For example, in one embodiment, the serial port 41 may enable the device 10 to be connected to one of the external devices 40a or 40b (FIG. 1). The connected external device 40a or 40b may be a desktop computer or similar system having a peripheral interface, such as cradle or other such mechanism, for connecting to the serial port 41 of the electronic device 10. The serial port 41 connection may enable two-way communications between the external device 40a or 40b and the electronic device 10 so as to provision the electronic device 10 with software updates or patches and/or change settings or configurations within the electronic device 10. In this regard, the external device 10 may include suitable utility software for interacting with the electronic device 10 via the serial port 41.

The short-range communications subsystem 41 is a further component which may provide for communication between the device 10 and different systems or devices, which need not necessarily be similar devices. For example, the subsystem 41 may include an infrared device and associated circuits and components or a Bluetooth™ communication module to provide for communication with similarly enabled systems and devices. In one example embodiment, the short-range communications subsystem 41 enables communications between the electronic device 10 and external devices 40a and 40b.

In one example embodiment, the wireless network 18 includes a wireless packet data network, (e.g. Mobitex™ or DataTAC™), which provides radio coverage to the electronic device 10. The wireless network 18 may also or alternatively include a voice and data network such as GSM (Global System for Mobile Communication) and GPRS (General Packet Radio System), CDMA (Code Division Multiple Access), or various other third generation networks such as EDGE (Enhanced Data rates for GSM Evolution) or UMTS (Universal Mobile Telecommunications Systems).

The software environment 50 of the electronic device 10 is configured to have at least two operating modes. One of the operating modes is a normal mode of operation. The normal mode of operation provides the user with the normal device functionality. For example, subject to password authentication and other normal device security measures, the user has access to the full range of user-invokable operations provided by the electronic device 10 when operating in normal mode.

Another operating mode is a honeypot mode of operation. The software environment 50 switches to a honeypot mode of operation in circumstances where the electronic device 10 may be presumed to be in the hands of an unauthorized user. The honeypot mode of operation enables the surreptitious tracking of usage of the device 10. Usage of the device 10 is secretly tracked by providing the unauthorized user with an interface intended to appear to be in normal mode, yet the device 10 may report usage to an external system or device. In some cases, in honeypot mode sensitive or confidential information or operations may be protected or removed from the electronic device 10. The usage reports and the fact that the device transmits them are hidden from the user, such that the user will be unaware that his or her activities are being monitored.

Figure 2:
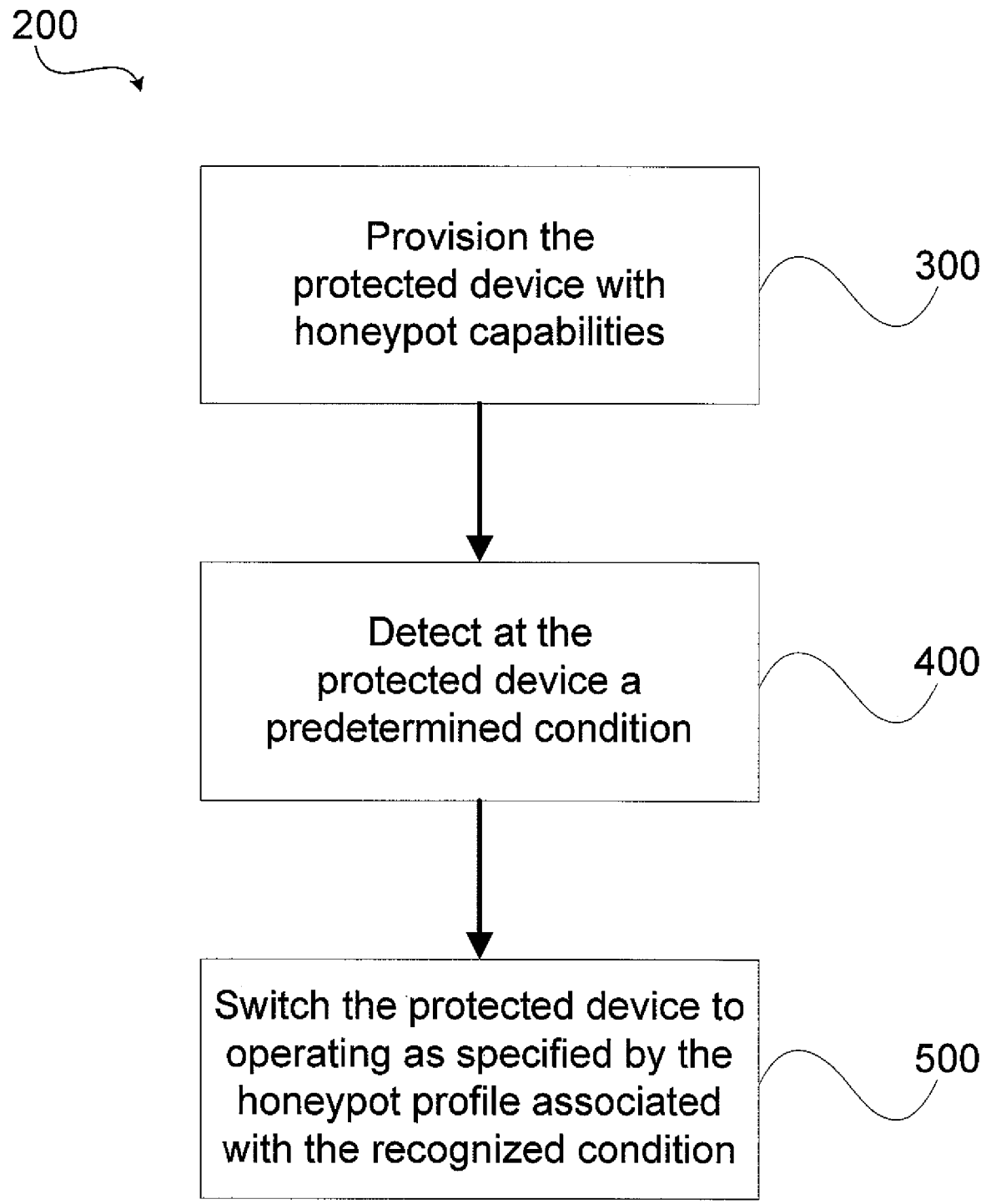
FIG. 2 is a flowchart showing the major steps in a method for providing a honeypot mode of operation for the protected device.

Reference is now made to FIG. 2, which shows, in flowchart form, a method 200 of surreptitiously tracking usage of the electronic device 10 (FIG. 1). The first step of the method 200 is to provision the protected device 10 at step 300 with honeypot capabilities, including the ability to recognize when and how to switch to operating in honeypot mode. In one embodiment, this step 300 includes providing the device 10 with the software environment 50 (FIG. 10) having both a normal mode of operation and the honeypot mode of operation.

The second step 400 is for the protected device to recognize the occurrence of a predetermined, honeypot-triggering condition. This step 400 may include an external trigger, such as a message from an external device or system. In another embodiment it may include internal recognition of a device condition without requiring an external trigger.

The third step 500 is for the protected device to switch from normal mode to operating in honeypot mode in response to the detected pre-determined condition. As noted above, the honeypot mode of operation may include sending non-user-detectable reports regarding device usage to an external device or system to enable the external device or system to track device usage.

Additional details, examples, and embodiments illustrating the three steps 300, 400, 500 are provided below.

First, reference is again made to FIG. 1, in which several external devices 30 are shown connected to the network 20. In one embodiment, only a single external device, for example 30a, is used to provision protected device 10 with honeypot capabilities, to send the initial triggering command ordering it to switch to operating in honeypot mode, and to monitor the usage of it by an unauthorized or mistrusted user. In another embodiment, the protected device is a handheld device and the provisioning may be done by device 40a or 40b through a temporary wired connection, such as a cradle holding the protected device 10 and/or a Universal Serial Bus (USB) connection to device 40a or 40b. In still another embodiment, a honeypot-triggering command may come from multiple sources, for example from either another external device 40a or 40b in direct communication with the protected device 10 (possibly a mobile device carried by the authorized user who has lost possession of the protected device) or one of the external devices 30 connected to the protected device 10 via network 20. In yet another embodiment, the monitoring duties may advantageously be split among more than one external device, say 30b and 30c, for reasons that will be explained later. From these few examples, it will be apparent to one skilled in the art that many other possible distributions of provisioning, triggering, and monitoring roles among external devices are possible. In yet a further embodiment, the triggering of a switch to operating in honeypot mode could be implemented by the protected device 10 autonomously (perhaps intelligently) recognizing, without assistance from an external device, that a situation had arisen warranting the switch to operating in honeypot mode. In some embodiments, such as in cases where the electronic device is only intermittently connected to an external device to which it must report, the sending of non-user-detectable usage reports may be an asynchronous activity, with reports on usage of the protected device being accumulated and stored for later transmission.

Reference is again made to FIG. 10. The software environment 50 of the electronic device 10 includes a mode-switch module 58, a honeypot profile 60 and pre-determined conditions 56. The pre-determined conditions 56 are the conditions under which the device 10 switches from normal operating mode to honeypot operating mode. The pre-determined conditions 56 may include the occurrence of one or more events. For example, in one embodiment the pre-determined conditions 56 may include receipt of a honeypot trigger message from an external system. In another embodiment, the pre-determined conditions 56 may include the input of ten or more incorrect password attempts by the device user. In some embodiments, the pre-determined conditions 56 may include a single condition; however, in other embodiments multiple conditions may give rise to a switch to honeypot mode.

The mode-switch module 58 monitors the device 10 to detect occurrence of one of the pre-determined conditions 56. Upon detecting one of the conditions, the mode-switch module 58 triggers the software environment 50 to switch from normal mode to honeypot mode.

The honeypot profile 60 may include information regarding the steps or operations to be implemented in switching to a honeypot mode. For example, the honeypot profile 60 may include information regarding the permitted operations 62 to be made available to the user when in a honeypot mode. It will be appreciated that the permitted operations 62 may include information regarding which operations are permitted or information regarding which operations are not permitted. For example, certain actions or operations, like the deletion of certain data, may not be permitted. In other embodiments, the permitted operations 62 may include information regarding which operations are monitored or tracked. In yet other embodiments, the permitted operations 62 may include information regarding modifications to the behaviour of certain operations that may, to the user, outwardly appear to operate normally.

The honeypot profile 60 may also provide protective actions to be taken by the software environment in switching to a honeypot mode. For example, certain sensitive or confidential data may be deleted or moved to an non-user-accessible area of memory. In some embodiments, data may also be backed up on an external device or system.

The honeypot profile 60 may also provide fictitious data or information to be made available to the user in place of the normal data or information. For example, fake contact information or financial data may be provided for user access in place of the authorized user's normal contact information or financial data.

The honeypot profile 60 may further dictate the structure, content and transmission frequency of a usage report 64.

In some embodiments, there may be more than one honeypot profile 60 on the electronic device 10. In such an embodiment, the mode-switch module 58 may trigger implementation of a selected one of the honeypot profiles 60 based upon the pre-determined conditions 56. In other words, the pre-determined conditions 56 may each have an association with one of the honeypot profiles 60.

The mode-switch module 58, the predetermined conditions 56, and the honeypot profile 60 are shown as separate software components in FIG. 10 for the ease of illustration. This is not intended as a limitation to the possible programming implementations for providing the functionality represented by these software components. It will be understood that one or more of these components may be implemented as a module, subroutine, object, or other programming construct as a part of the operating system 52 and/or one or more of the software applications 54. The suitable programming of the electronic device 10 to implement the operations and functions represented by these software components will be within the skill of a person of ordinary skill in the art having regard to the description of the present application.

Figure 3:
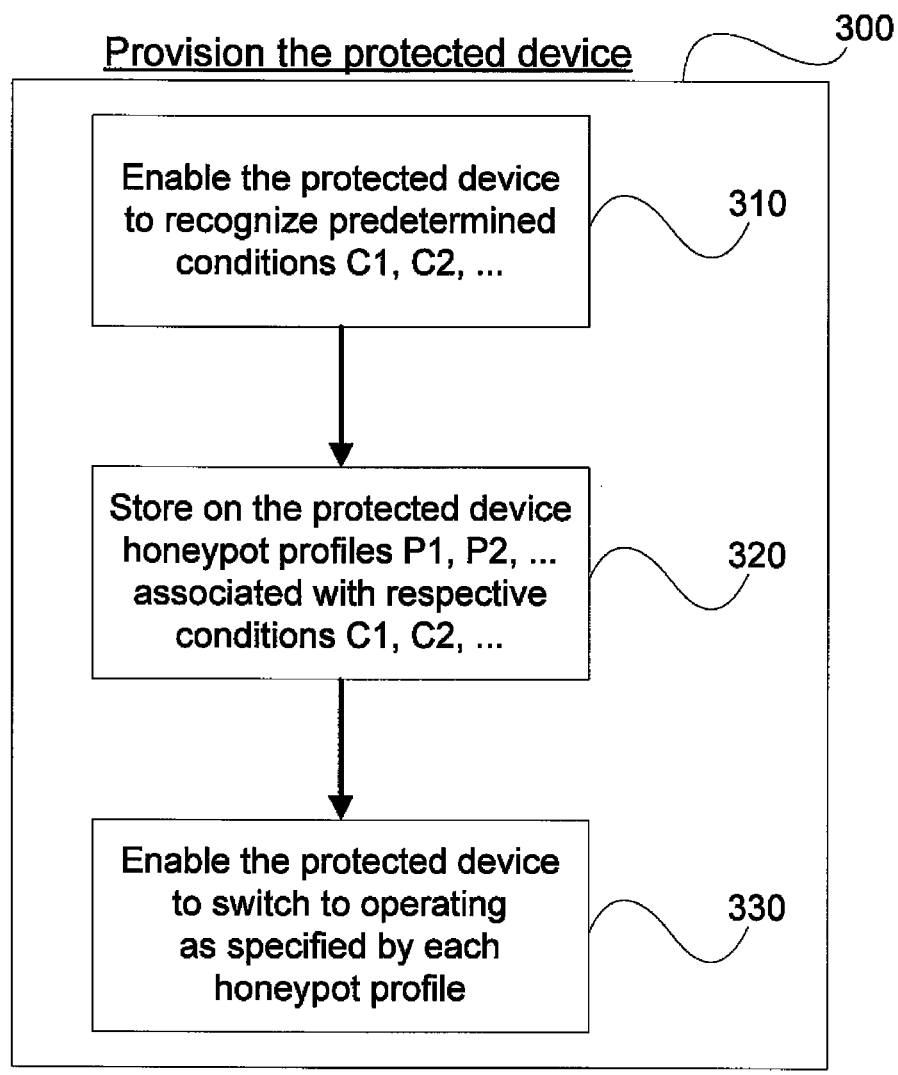
FIG. 3 shows in flowchart form the step of provisioning the protected device with honeypot capabilities.

Reference is now made to FIG. 3, which shows provisioning step 300 from FIG. 2 broken down into three subsidiary steps. In overview, protected device 10 (FIG. 10) and, in particular, the software environment 50 (FIG. 10), may be provided with three types of honeypot capabilities: to know how to recognize one or more predetermined conditions, to know what to do in each case, and to know how to do it in each case. This provisioning may be done through a variety of possible connections with an external device including: a direct, wired connection (e.g. using a cradle); a direct, wireless connection; a private network connection; and a virtual private network connection.

In one embodiment, the provisioning may be carried out by a manufacturer or distributor of the protected device 10 as a part of software installation on the device 10 prior to distribution to a device user or consumer. In another embodiment, the provisioning may be carried out as a software update or patch to existing code on the protected device 10 already distributed to a user. The software update or patch may be sent by the external device to the protected device 10 via a wireless connection, a wired connection (e.g. using a cradle), or through any other communication link.

In the case where the provisioning is performed by way of a software update or patch, the protected device may receive a communication from the external device. The protected device 10 may take steps to authenticate the communication to ensure that the software update or patch is from an authorized source. The authentication may include a variety of mechanisms, including the use of encryption and/or a challenge-response exchange between the protected device and the external device. Once the communication has been authenticated, the protected device may perform the software installation and/or update.

At step 310, protected device 10 is given the ability to recognize at least one honeypot-triggering condition warranting switching to operating in honeypot mode, i.e. the device may be provided with one or more pre-determined conditions 56 (FIG. 10). The condition may be the reception of a command from an external device or may be the detection of an internal state of the protected device. In some embodiments, there may be a need to have several different honeypot-triggering messages from an external device to indicate differing circumstances requiring respective protective actions that differ accordingly. For example, it may be advantageous to perpetrate a more sophisticated deception on an unsuspecting, unauthorized user when the authorized user loses the protected device in circumstances that make it likely that the unauthorized user knows the owner's identity than when it is unlikely that the unauthorized user knows the owner's identity. In the former case, a message M1 may be sent, and its reception at the protected device may be recognized as condition C1. In the latter case, a different message M2 may be sent, and its reception at the protected device may be recognized as condition C2. Likewise, in some embodiments there may be one or more different honeypot-triggering conditions based solely on the internal state of the protected device.

In continuing reference to FIG. 3, at step 320, protected device 10 is provided with a honeypot profile 60 (FIG. 10) associated with each of the predetermined honeypot-triggering conditions. Continuing with the example just introduced, profile P1 may correspond to condition C1 and may specify that certain publicly available information about known associates of the authorized user (in an address book, for example) deliberately be allowed to remain on the protected device 10. Conversely, profile P2 corresponding to condition C2 may specify the construction of a totally fictitious address book. As noted above, two predetermined conditions may have identical honeypot profiles associated with them.

Figure 9:
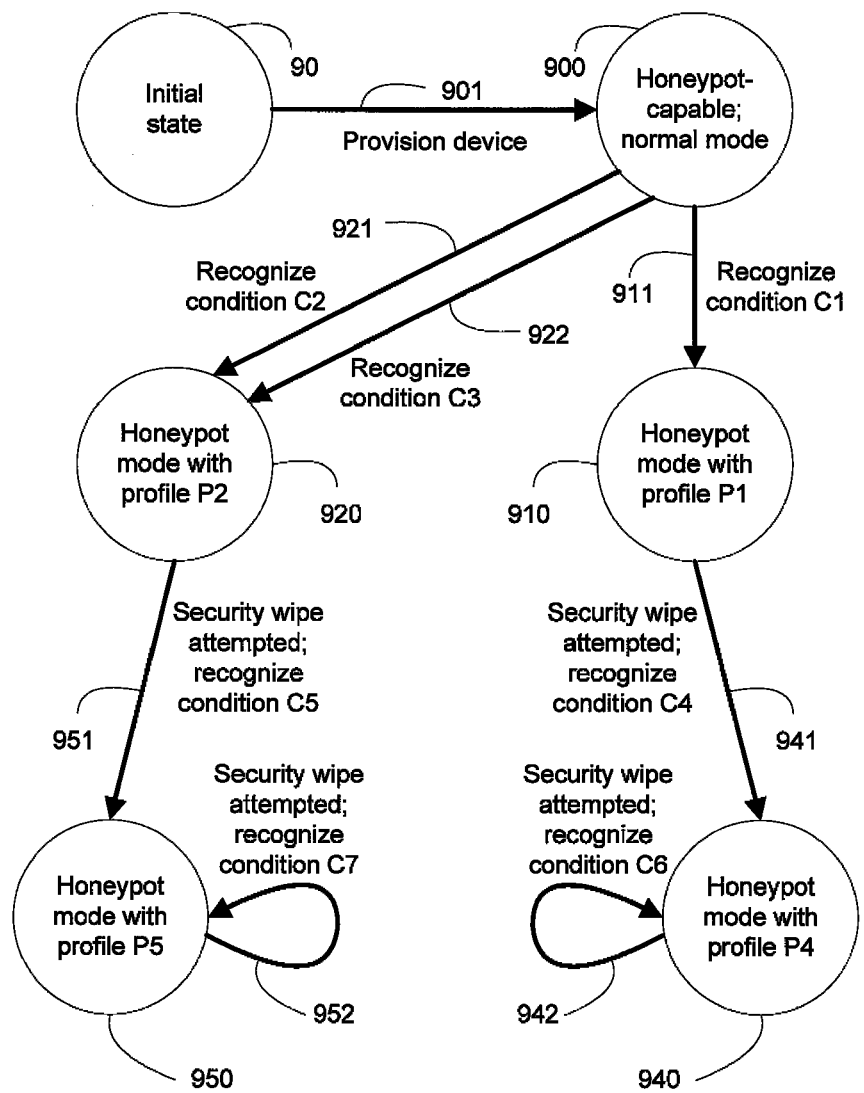
FIG. 9 is a state diagram showing the relationship between different states of the protected device according to yet another embodiment.

Reference is briefly also made to FIG. 9, which shows an example state diagram illustrating the relationships between states of an electronic device. In the state diagram of FIG. 9, step 300 of FIG. 3 is illustrated as provisioning transition 901 from initial state 90 to a honeypot-ready state 900. Once in honeypot-ready state 900, the detection of condition C2 or C3 is represented by transitions 921 and 922, respectively, each taking the protected device to the state 920, in which a common profile P2 is used to specify the particulars of the honeypot mode. This could occur, for example, if the same type of protection is warranted under two different sets of circumstances: one, an internal state of the protected device, recognized as condition C2; the other, a loss reported to an agency or IT department, which, in turn, sends a command to the protected device, which recognizes it as condition C3. In practical terms, the person skilled in the art will appreciate that a honeypot profile could be stored in various ways. In one embodiment, this storage would take the form of certain user-inaccessible system variables, called "honeypot flags," being given certain values.

Referring again to FIG. 3, at step 330 protected device 10 is provided the ability to switch to operating in honeypot mode as specified by each of the honeypot profiles. In one embodiment step 330 includes providing the protected device 10 with the mode-switch module 58 (FIG. 10). Step 330 may further involve updating, modifying or replacing code for implementing other operations or functions on the device. It will be apparent to the person skilled in the art that configuring the protected device to have this ability may take a variety of forms. In one embodiment, existing computer code for a particular operation of the protected device is replaced by code which is prepared to detect one or more honeypot flags and to execute differently depending on the state of those flags. In other words, the function will behave one way in normal mode, another way when honeypot profile P1 is in effect, yet another way when honeypot profile P2 is in effect, and so on.

The step of provisioning the device may take place in stages. For example, it may be advantageous at the time of the initial provisioning of the protected device to store code already predisposed to be "polymorphic" as just described (so that code is not replaced at step 330), but later (and perhaps by means of a different external device) to store information on predetermined conditions and profiles. In particular, the listing of subsidiary steps within step 300 in FIG. 3 is meant neither to limit their execution to any particular sequence nor to imply that they are executed in temporal proximity to one another.

It will be become apparent that whatever honeypot capabilities have been imparted to protected device 10 by step 300 may be stored in data and computer code in such a way that they cannot be detected or modified by the user. Although this may be accomplished purely through software means, in one embodiment memory 24, 26 (FIG. 10) of the protected device 10 may be designed from a hardware standpoint to accommodate the needs of honeypot provisioning for stealth and persistent memory.

Figure 4:
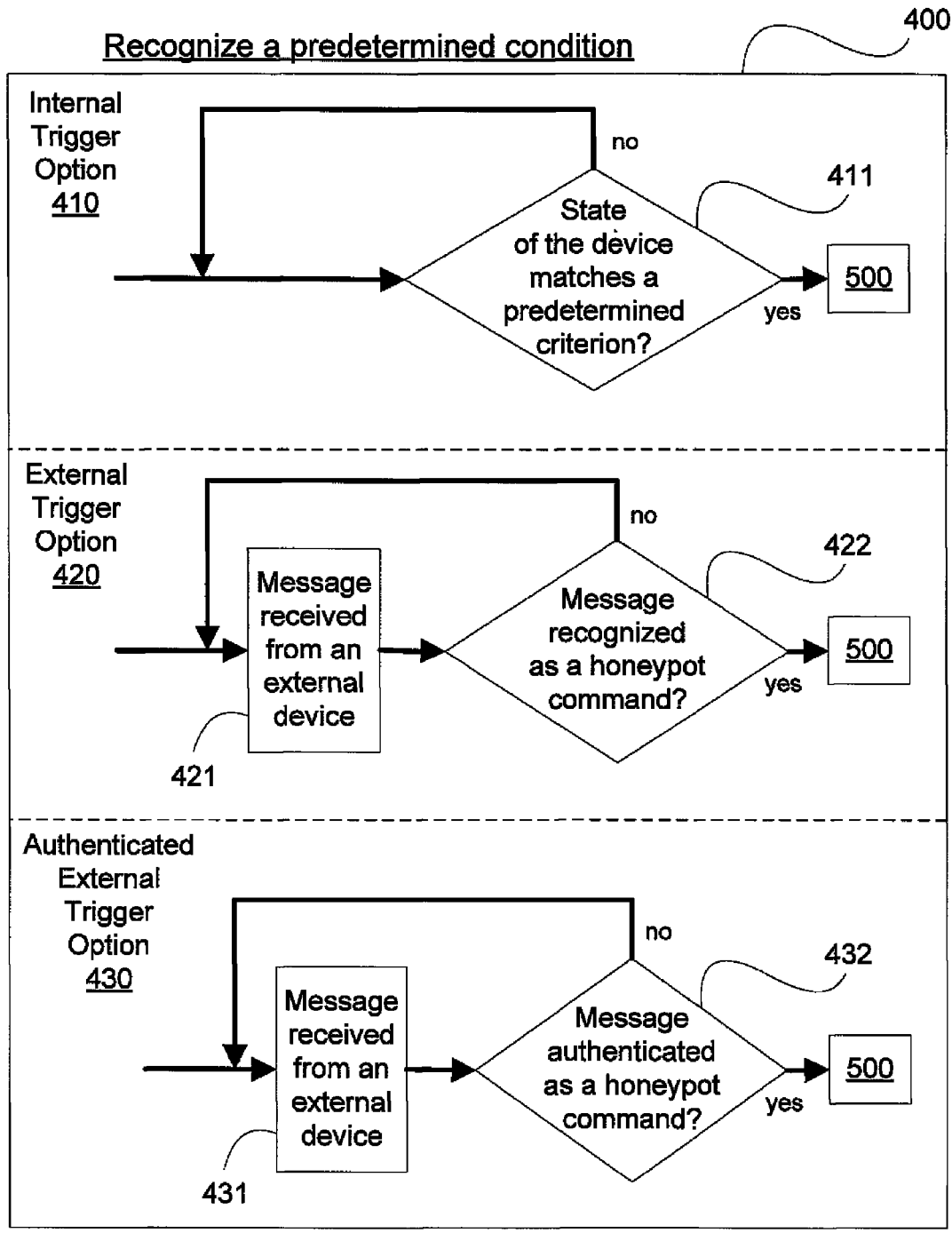
FIG. 4 shows in flowchart form three options for implementing the step of recognizing a predetermined condition.

Reference is now made to FIG. 4, which illustrates, in flowchart form, three different options for detecting a predetermined condition in step 400 from FIG. 2. It will be apparent that more than one of these honeypot-triggering options may be used in some embodiments. Moreover, in light of what has already been said in respect of the value of having the protected device operable to recognize different conditions, it will also be apparent that the protected device may be provisioned to implement more than one instance of any or all of the three options.

In Internal Trigger Option 410, protected device 10 monitors its internal state to see if it matches at step 411 a predetermined criterion which warrants ordering the protected device to operate in honeypot mode. If it does, then the protected device proceeds to step 500 (FIG. 2). Otherwise, the protected device continues to monitor its internal state at step 411. In some embodiments a variety of predetermined criteria may be tested at step 411. By way of illustration only, an nth failed attempt to enter a password might be the internal, honeypot-triggering event, where n is a predetermined value, for example 10. As envisioned here, the nth failed attempt would not block further password attempts (as is often the case in many systems). Rather, it would be "accepted," leading the unsuspecting user into the honeypot snare. In one embodiment, a sophisticated system may intelligently monitor the usage of the protected device to spot a usage pattern uncharacteristic of the authorized user, which would give rise to an internal honeypot-triggering event.

In External Trigger Option 420, protected device 10 awaits a message from an external device such as external device 30a (FIG. 1). A message is received at step 421 and checked at step 422 to see if it recognizes the message as a honeypot-triggering command. If it does, then the protected device proceeds to step 500 (FIG. 2). Otherwise, the protected device continues to await a message at step 421. In some embodiments, a command to switch to operating in honeypot mode may be sent by a central server in, for example, the event the authorized user had reported the protected device lost or stolen to an agency or an IT department. It will be apparent that the report and the command could be made in a variety of manners. In some embodiments, the authorized user of the protected device may transmit a message from another device, such as external device 40b (FIG. 1) or 30d (FIG. 1), so as to switch the protected device to operating in honeypot mode without the assistance of any designated honeypot-triggering entity or device.

In Authenticated External Trigger Option 430, protected device 10 again awaits a message as in option 420. A message is received at step 431 and authenticated at step 432 to verify that the message is a legitimate honeypot-triggering command sent by an authorized sender. If it is, then the protected device may proceed to step 500 (FIG. 2). Otherwise, protected device continues to await a message at step 431. It will be appreciated by one skilled in the art that authentication of the message may take a variety of forms, including the use of encryption and/or a challenge-response exchange between the protected device and the external device from which the initial message was sent.

Figure 5:
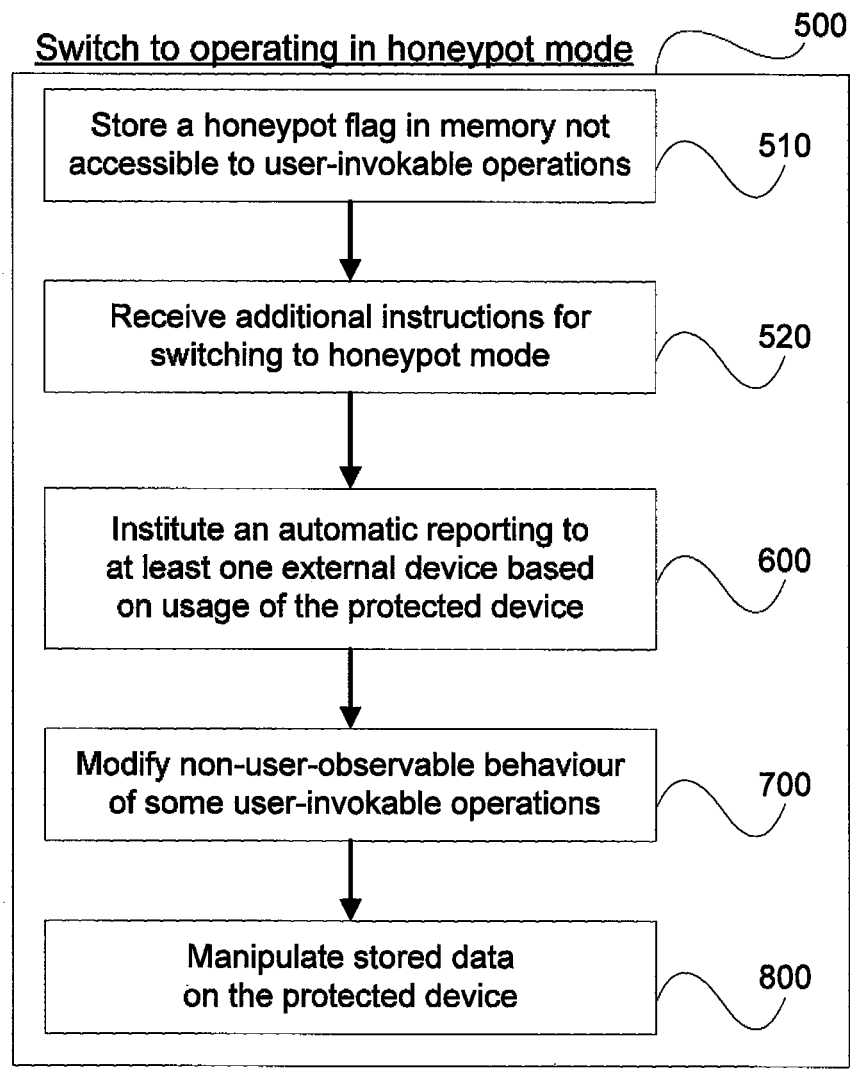
FIG. 5 shows in flowchart form the step of switching to operating in honeypot mode according to one embodiment.

Reference is now made to FIG. 5, which illustrates, in flowchart form, the mode-switching step 500 of FIG. 2 broken down into five subsidiary steps. The listing of subsidiary steps is meant neither to limit their execution to any particular sequence nor to imply that all steps must be executed.

A potential advantage of having a device operate in honeypot mode rather than protectively disabling the device is that the ability to monitor usage opens the door to learning who has the device and where it is located (in the case of a lost or stolen device) or to learning the motives of an employee no longer trusted. Since obtaining information about the identity and/or motives of an unauthorized user is the primary goal of any honeypot, in many embodiments the step 500 includes step 600 wherein reports are automatically sent to at least one external device based on usage of protected device 10. Because the unauthorized user will continue to have access to the device and at least some of the device functions/operations when the device operates in honeypot mode, in some embodiments it may be advantageous to block or control certain usage of the device by modifying, at step 700, the non-user-observable behaviour of some user-invokable operations and to protect the integrity and privacy of some data by manipulating, at step 800, such data. Each of steps 600, 700, and 800 are discussed in greater detail below in connection with other figures. As will then become apparent, steps 600, 700, and/or 800 may overlap to some degree in certain embodiments.

Continuing in reference to FIG. 5, it has already been mentioned that one or more honeypot flags could be assigned values which could be used by honeypot-aware operations predisposed to perform differently depending on the values of the flags. In one embodiment, the protected device 10 may include a security-wipe function (or some other re-provisioning method, perhaps using a cradle) in which the device would ordinarily be reset to a pristine, initial state. In such an embodiment, step 500 may include step 510, in which a honeypot flag is stored in memory not accessible to user-invokable operations, including the security wipe (perhaps modified at step 700 to be a fake, i.e. partial, security wipe). The persistence of the honeypot flag may serve as an indication to the device, even after being "wiped," that it should continue to operate in honeypot mode, but perhaps with a different honeypot profile (also persistent) in effect.

Reference is again made to FIG. 9 to illustrate by way of the state diagram the operation of an embodiment of the protected device in circumstances of a security wipe. In one example, with the device in honeypot mode at state 910, i.e. operating under honeypot profile P1, a security wipe may be performed which may be recognized as condition C4, resulting in transition 941 to state 940, resulting in honeypot profile P4 being put into effect. A subsequent security wipe may be recognized as condition C6, resulting in transition 942 back to state 940, with honeypot profile P4 being maintained. Having a different profile for a post-security-wipe state advantageously allows the protected device to masquerade as a "wiped" device, lacking real and/or falsified data that would (seemingly) have been left behind by the authorized user, but retaining its abilities to report on usage and to block or control certain activities.

Returning to FIG. 5, in one embodiment the initial triggering of the switch to operating in honeypot mode could signal the protected device 10 to be receptive at step 520 to further instructions for making the switch. These instructions may be, for example, additional parameters, data, and/or code for completing or customizing a honeypot profile.

Figure 6:
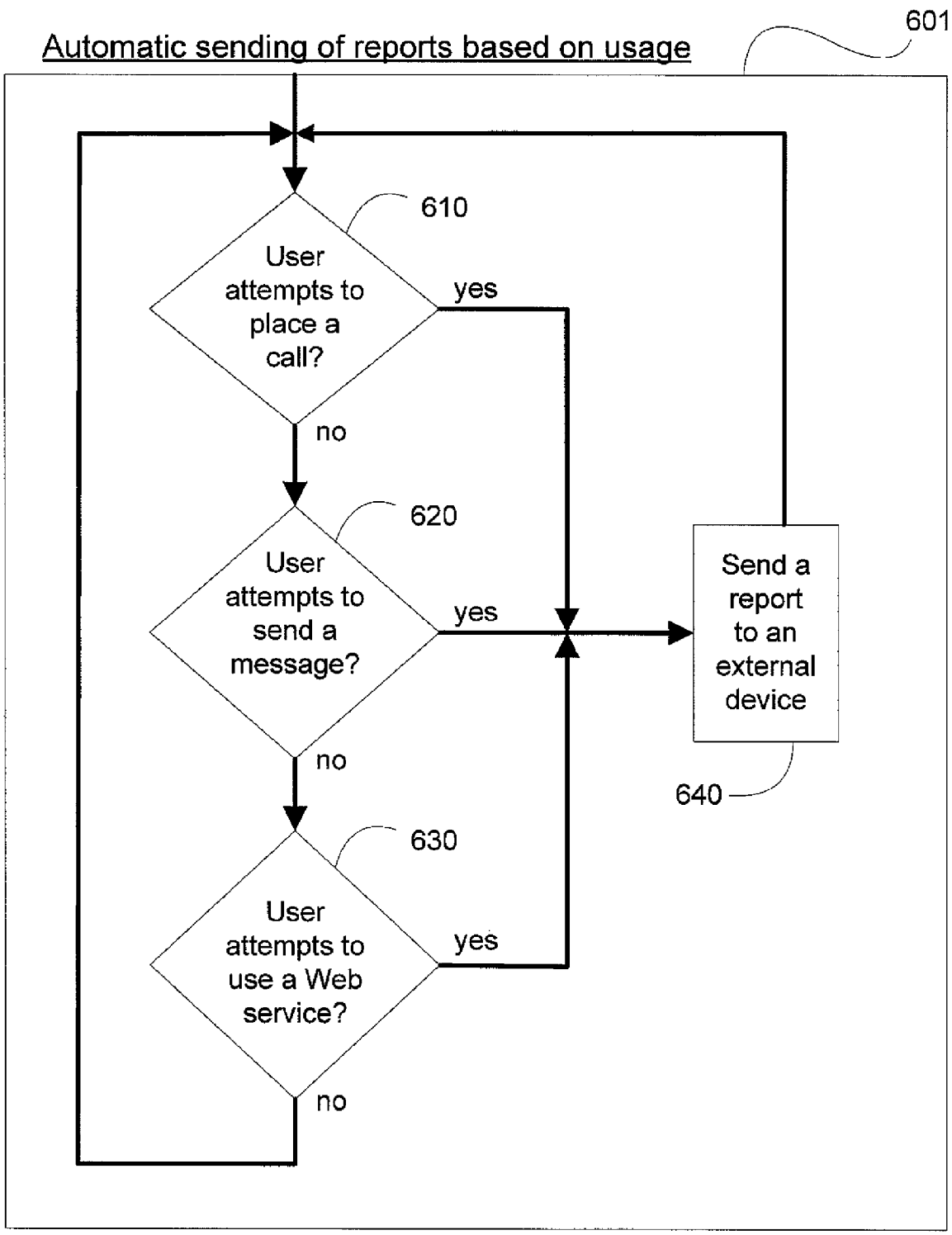
FIG. 6 shows in flowchart form an automatic sending of reports, instituted by another embodiment, based on usage of the protected device.

Turning now to FIG. 6, shown is an example flowchart of a method 601 for automatically sending reports to at least one external device 30 (FIG. 1) based on usage of the protected device 10 (FIG. 1). The example method 601 illustrates one embodiment of the step 600 shown in FIG. 5. The method 601 includes steps 610, 620, and 630, which are three illustrative conditions under which a report will be sent at block 640. Not shown in the diagram is the issuing of reports in different formats depending on whether the user invoked a call-placing operation (detected at step 610), a message-sending operation (detected at step 620), or a Web-service-usage operation (detected at step 630). It will be appreciated that in some embodiments, it may be advantageous to have reports on different types of usage sent to different external devices 30. For example, attempts to send unauthorized electronic messages might be reported to external device 30a while attempts to make unauthorized phone calls might be reported to external device 30b. Furthermore, in one embodiment attempted phone calls may be reported to two different external devices 30. As an example, an external device may monitor a phone call intended for external device 30d; in such case, legal requirements in some jurisdictions might require that a recording of the phone call be stored (perhaps temporarily) at external device 30c while allowing only a report of the phone number dialled to be sent to external device 30b. It will be apparent that other user actions could be monitored and reported.

In some embodiments, a high-level monitoring procedure may detect each of the conditions at steps 610, 620, and 630 and formulate a report appropriate to each respective triggering event. In other embodiments, there may be a separate high-level monitoring procedure for each of said conditions. In yet another embodiment, the operations invoked may be modified to trigger the sending of a report, as indicated by way of step 700 of FIG. 5. This illustrates how some honeypot functionality may be achieved equivalently under the rubric of step 600 or the rubric of step 700.

The device usage reports may contain a variety of information including, but not limited to: time of usage events; phone numbers dialled; caller-ID information received at the device; entire phone conversations; FROM, TO, CC, and BCC fields of electronic messages sent or received; entire electronic messages and their attachments; Websites accessed; stored data accessed or altered; and operations invoked. Other types of information will be apparent to those of ordinary skill in the art.

In some embodiments, due to the possibly intermittent connectivity of protected device 10 to network 20 (FIG. 1), delays may arise in sending reports. It will also be appreciated that the protected device may be designed to signal, perhaps by means of a dedicated light or an icon on a screen, that it is sending or receiving information via its network connection. If the protected device is so designed, this feature may be overridden in honeypot mode so that the surreptitious communication between the protected device and an external device such as 30a is not revealed to the user. In fact, the honeypot deception is aided by the presence of such a light or icon that indicates in normal mode all data transfer but indicates in honeypot mode only data transfers of which the (duped) user should be aware.

Referring back to FIG. 5, step 700 of mode-switching step 500 modifies user-invokable operations to report on usage, to prevent or control use of certain services, and to maintain the integrity of data on protected device 10. To assist in deceiving the unauthorized user, in some embodiments the normal behaviour of a user-invokable operation may be modified in such a way that the user-observable behaviour of the operation appears as it would to the user if the protected device were still in normal mode. In other words, the user is prevented from initiating an undesired action, while presenting the user with the illusion that such action did, in fact, take place in the normal fashion, thereby hiding from the user the reality that the protected device is now in a mode designed to entrap him/her. In some embodiments, modifying a user-invokable operation may entail adding to its functionality a surreptitious report to an external device such as 30a. As noted earlier, some honeypot functionality may be achieved equivalently via either step 600 or step 700.

Figure 7A:
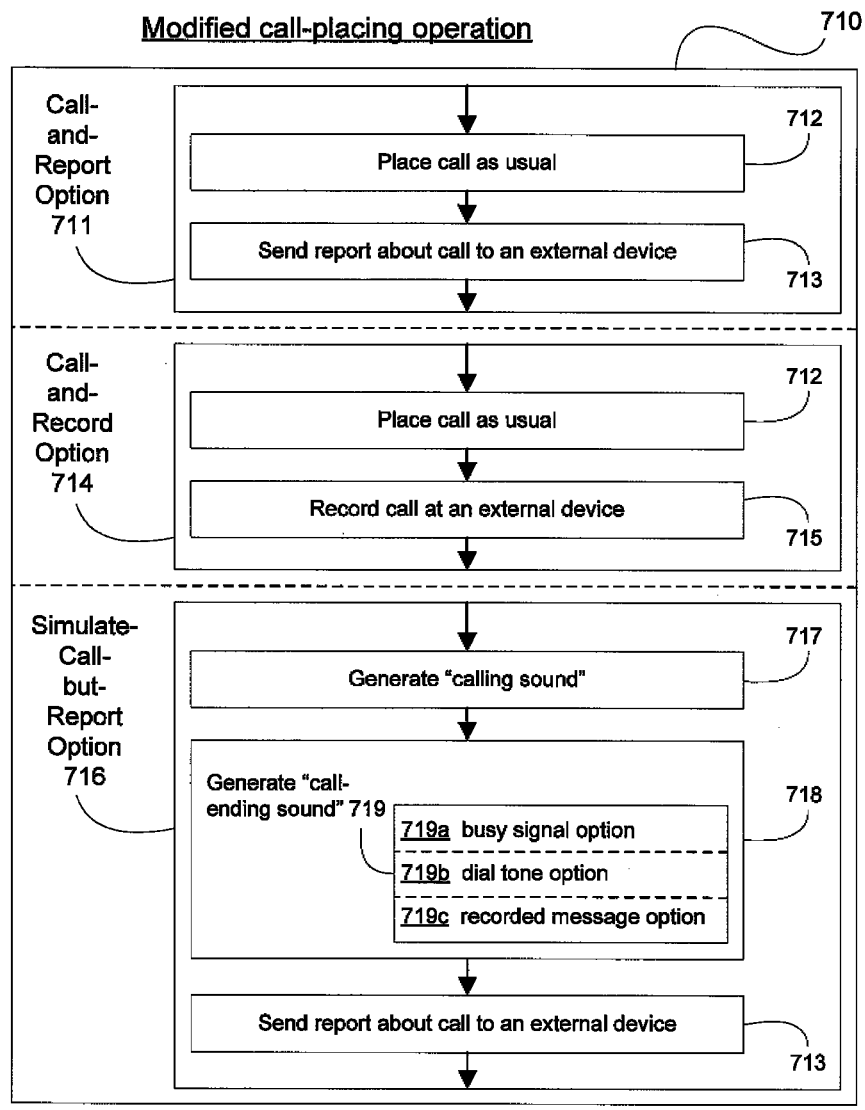
FIG. 7A shows in flowchart form three options for a modified call-placing operation.

In one embodiment, the modification of user-invokable operations in step 700 includes modifying an operation for placing a phone call. Reference is now made to FIG. 7A, which shows three options for a modified call-placing operation 710 resulting from step 700 (FIG. 5). By way of example, in each option the party being called would normally receive the call at external device 30d. A Call-and-Report Option 711 comprises placing the call at step 712 to external device 30d as normal and additionally sending a report at step 713 to an external device, say 30b. The report may include data regarding the call, including any of the following: the phone number dialled, any caller-ID information received at the protected device, and the time the call was made.

A Call-and-Record Option 714 comprises placing the call at step 712 to external device 30d as normal and additionally recording the call at step 715 at an external device, say 30c. Due to regulatory considerations in different jurisdictions, it may be required that external device 30c be under the control of a law enforcement agency.

A Simulate-Call-but-Report Option 716 begins, at step 717, generating a sound, such as a ring tone, at the earpiece (not shown) of the protected device to simulate a call being placed. At step 718, a call-ending sound 719 is generated to simulate the call being terminated in some fashion. At step

713, a report is sent to an external device, say 30b. Illustrative options for a generated sound 719 simulating call-termination at step 718 include, but are not limited to: a busy signal 718a, a dial tone 718b, and a recorded message 718c, such as "Service to that area is not available at this time." The sounds to simulate placing and terminating a call may be stored on the protected device during the initial honeypot provisioning at step 300 (FIG. 2) or may be received by the protected device at a later time as part of the additional instructions indicated in step 520 (FIG. 5).

Figure 7B:
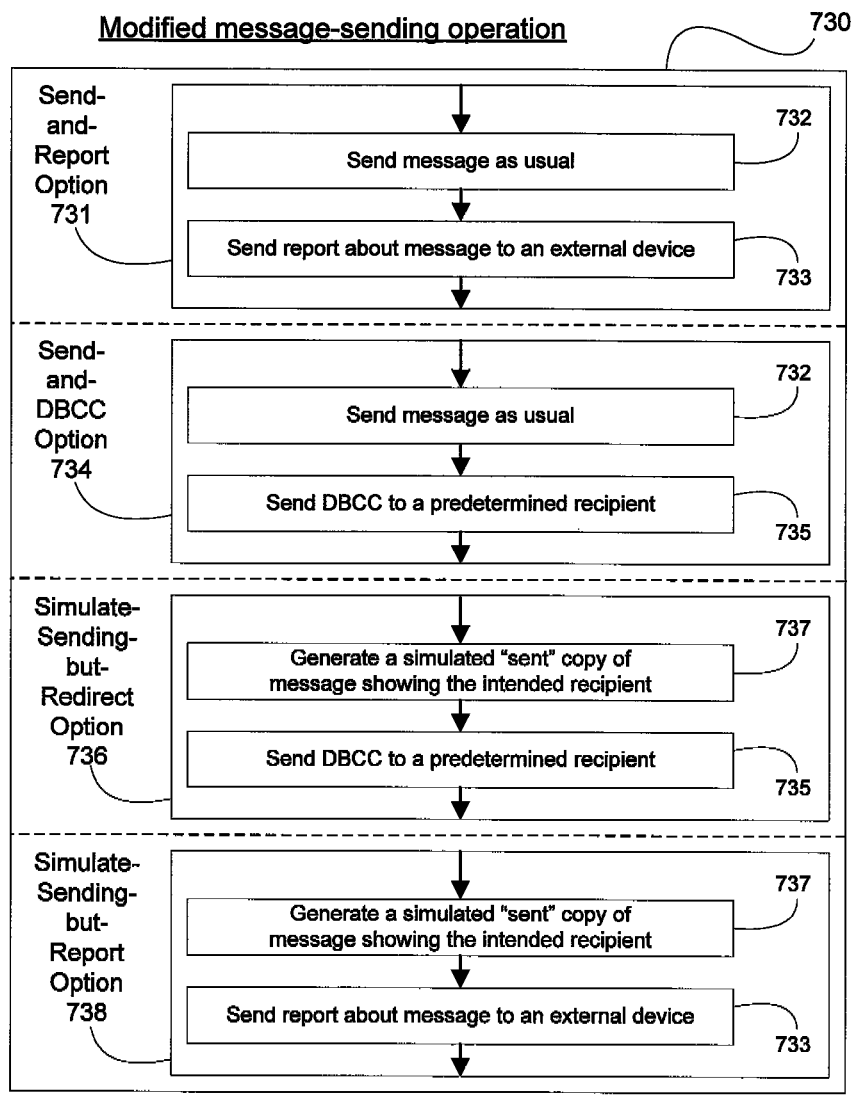
FIG. 7B shows in flowchart form four options for a modified message-sending operation.

In another embodiment, the modification of user-invokable operations in step 700 includes modifying a message-sending operation. In reference to FIG. 7B, shown are four separate options for a modified message-sending operation 730 resulting from step 700 (FIG. 5). By way of example, in each option, X, the intended recipient of the message, would normally receive the message at external device 30d. It will be understood that there may be multiple recipients, some listed in the message's TO field, others perhaps listed in the CC and/or BCC fields. It will be understood that in some cases X may represent various recipients: multiple intended recipients receive a message only if X does and are listed as recipients on the "sent" copy accessible by the user if X is.

Continuing in reference to FIG. 7B, the various options for modifying a message-sending operation are now described. A Send-and-Report Option 731 comprises sending at step 732 the message to X at external device 30d as normal and additionally sending at step 733 a report to an external device, say 30b. The report may include data regarding the message, including any combination of the following: the TO, CC, BCC fields; the time the message was sent; the message body; and any attachments.

A Send-and-DBCC Option 734 comprises sending at step 732 the message to X at external device 30d as normal and additionally sending at step 735 a doubly blind carbon copy (DBCC) of the message to Y, a predetermined recipient excluded from all fields of both the message received by X and the sent copy stored on protected device 10 (and accessible by the user).

A Simulate-Sending-but-Redirect Option 736 comprises generating at step 737 a simulation of a "sent" copy of the message showing X as recipient (even though the message is not sent to X) and sending at step 735 a DBCC of the message to a predetermined recipient Y.

A Simulate-Sending-but-Report Option 738 comprises generating at step 737 a simulation of a "sent" copy of the message showing X as recipient (even though the message is not sent to X) and additionally sending at step 733 a report to an external device, say 30b. It will be appreciated that variations of these options are anticipated.

Figure 7C:
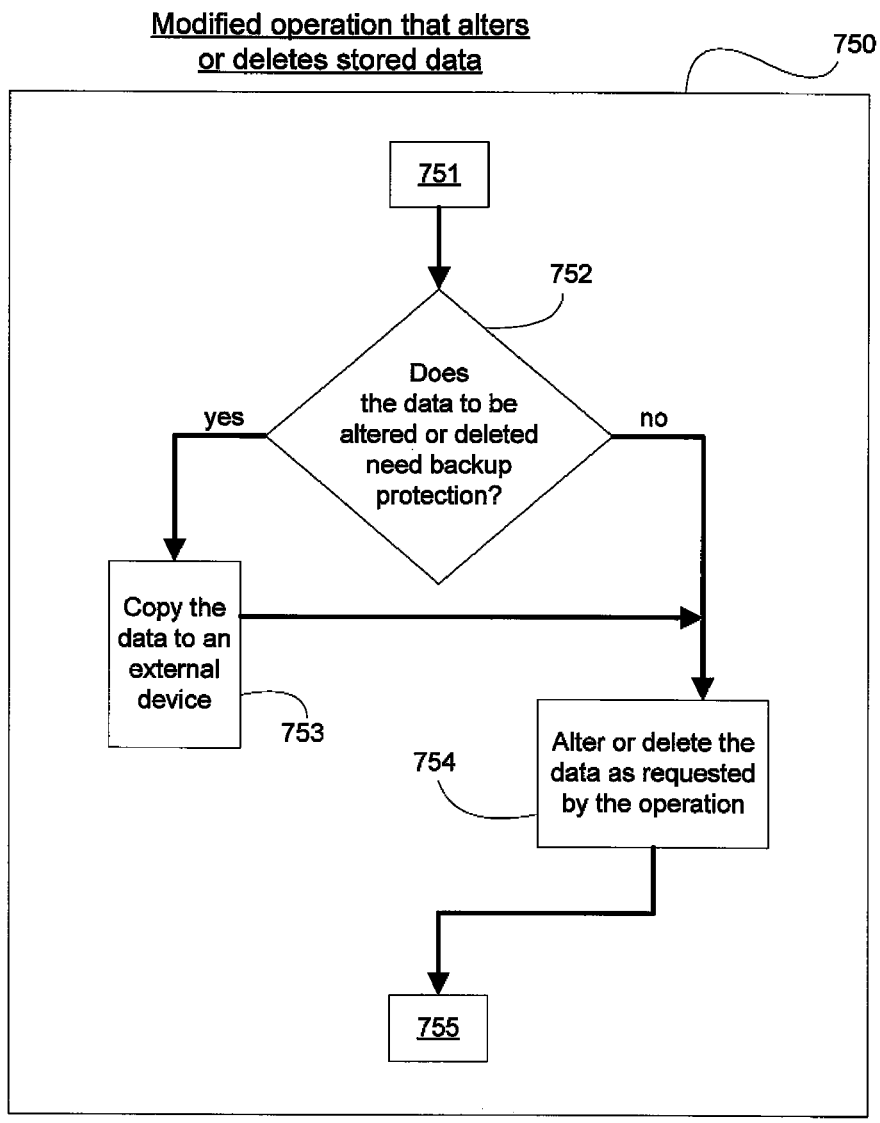
FIG. 7C shows in flowchart form a data-protective portion of a modified operation that alters or deletes data.

In yet another embodiment, the modification of user-invokable operations in step 700 includes modifying an operation that alters or deletes certain data. Reference is now made to FIG. 7C, which shows an embodiment of a modified method 750 resulting from step 700 (FIG. 5). The method 750 begins with programming control passing from pre-existing code segment 751 and ends with programming control passing to pre-existing code segment 755. At test 752, a check is made to see whether the data to be altered or deleted has been designated as requiring backup protection. If yes, the data is copied at step 753 to an external device such as 30a, preferably bundled with some indicia to specify the original role or storage location of the data so that it can be restored to its rightful role or storage location in protected device 10 (if, at a later date, it is returned to normal mode) or some other device. If not, no such copying takes place. In either case, data is then altered or deleted at step 754 in accordance with what would have taken place had the protected device been in normal mode. It will be appreciated by one skilled in the art that, depending on the particular circumstances, it may be possible alternatively to have blocks 753 and 754 executed unconditionally, i.e. to delete the test 752.

It will be understood that the step 700 of modifying user-invokable operations on protected device 10 need not do so by literally rewriting code at the time the honeypot mode is activated. While certain programming regimes may accommodate "plugging in" code segments (or modifying scripts that direct the generation of programming code), in some embodiments the "modifying" could be done in a more traditional programming environment as follows: The programming code for each relevant operation is written to look for and test one or more "honeypot flags" and to function according to the value of the flag(s). Such flags might be binary ("cleared" in normal mode and "set" in honeypot mode) or could have different values depending on the particular honeypot profile in effect. As mentioned earlier, such system parameters may be hidden from the user.

In yet another embodiment certain actions taken by some user-invokable operations may be "intercepted" by the operating system or by a monitoring program running in background, either of which could act as a kind of proxy. For example, redirection of e-mail could be accomplished by allowing the e-mail program to function as usual, monitoring the port used for e-mail transmission, and then routing each message to a pre-determined destination.

From the foregoing description It will be apparent that other user-invokable operations not covered by the three illustrative categories listed in FIGS. 7A to 7C may be modified in step 700 (FIG. 5).

Figure 8:
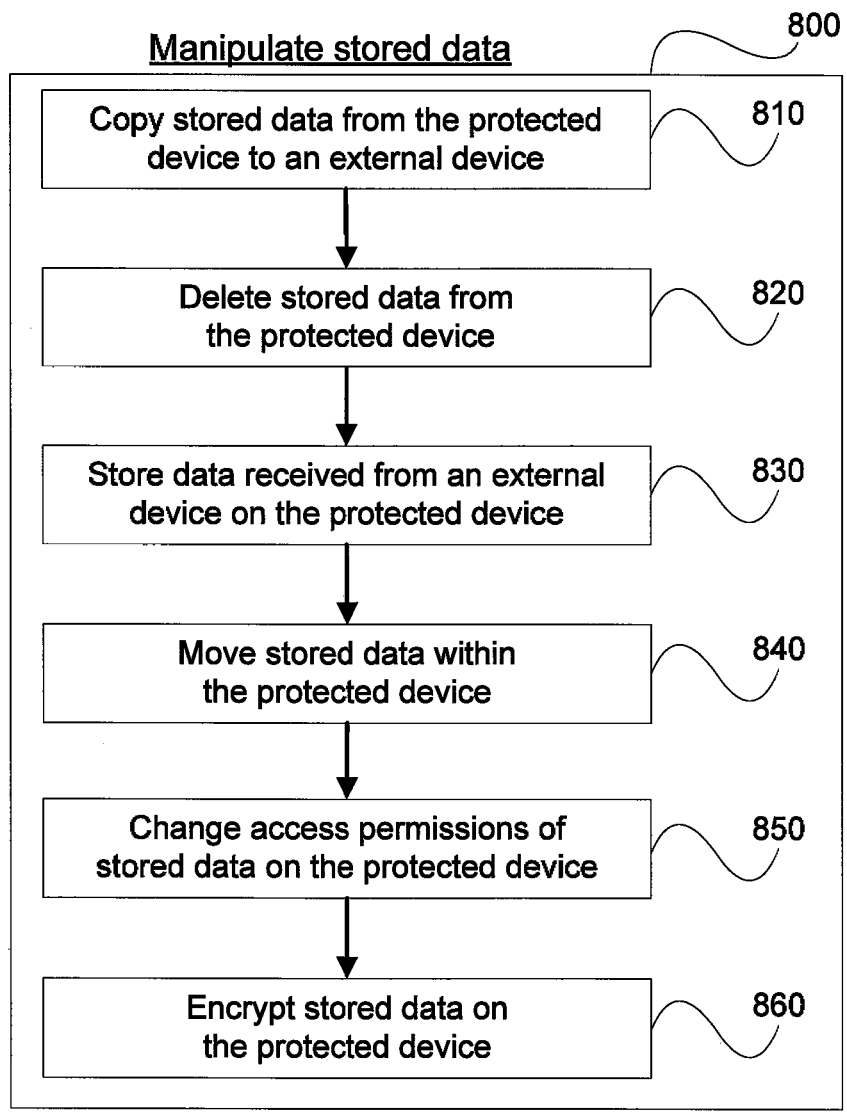
FIG. 8 shows in flowchart form a manipulating of stored data according to still another embodiment.

Reference is now made to FIG. 8, which shows an embodiment of the data-manipulating step 800 from FIG. 5 broken down into subsidiary steps, which may be performed in any order. It will be understood that one or more of the steps may be omitted as the desired level of security permits. Steps 810 through 860, therefore, present a selection of options that may be implemented in any combination. It will be appreciated that this listing is illustrative, not exhaustive.

One consideration in manipulating the data stored in memory of the protected device 10 is to prevent unauthorized access to sensitive data. Privacy may be one concern. Another may be the integrity of the data. Should a lost or stolen device be reunited with its authorized user, he/she would not want to depend on stored data that may have been corrupted by unauthorized changes made by the temporary, unauthorized user. This would especially be the case if the data were unique, with no backup copy existing on some other device or storage medium.

A second consideration when manipulating stored data at step 800 is that a device that is fully functional but has been "wiped" of certain data advertises itself as having (from the standpoint of a malicious user) been "compromised" in the sense that it is has been subjected to a protective action. Therefore, it may be advantageous to leave some non-sensitive data intact and/or to plant some data that is misleading, i.e. untrue but plausible. As mentioned earlier, if the user has attempted a security wipe while protected device 10 is operating in honeypot mode, it would be disadvantageous to plant fake data or to retain in an accessible form data that the user would expect to see wiped. Examples of non-sensitive data may include publicly available phone numbers for people who would be known to be associated with the authorized user of protected device 10, but many other such examples will be apparent. Examples of misleading data may be financial records, but many other such examples will be apparent.

Continuing in reference to FIG. 8, at step 810, data is copied to an external device such as 30a. This supports its availability in case the user alters or deletes the data. If privacy of the data is also desired, at step 820 it may be deleted from the memory of the protected device 10. Alternatively, data known to be backed-up elsewhere or to be "expendable" may be deleted at step 820 without first copying it at step 810. In some cases, a lack of certain data expected by the user may tip him/her off that security measures have been taken on the protected device. Consequently, it may be desirable to use step 820 in conjunction with step 830, at which data received from an external device such as 30a is stored in the memory of the protected device. In one embodiment, such data may include fake information ("disinformation") planted to simulate real data.

Still in reference to FIG. 8, at step 840, data is moved within the memory of the protected device 10. This may be done to preserve the data on the protected device, and place the data in an area of memory not accessible to any user-invokable operation while the protected device is operating in honeypot mode. Conversely, internally stored disinformation may be moved from an area that is not accessible to user-invokable operations to an area that is. Similar ends may be accomplished at step 850 by leaving data in place but changing access permissions for the data. In one embodiment, the movement of data within the memory may have a steganographic effect, hiding sensitive data within accessible, innocuous data; a typical application of steganography is for hiding small text files within relatively large graphic files.

Related to the idea of controlling data access is that of encrypting data at step 860 by any known means appropriate for the type of data and the level of security desired; these methods include, but are not limited to, the Advance Encryption Standard (AES) and the Triple Data Encryption Algorithm (TDEA). Encryption may tip off the user that the protected device has been protected. Having no encrypted data may also look suspicious. A mix of encrypted data and unencrypted (as might be expected) can lead the user into believing the unencrypted data is legitimate, when in fact it may be disinformation. In entrapping a sophisticated unauthorized user (perhaps an employee no longer trusted) known to possess certain decryption knowledge, weakly encrypting disinformation is one possible approach.

The techniques disclosed above in relation to step 800 and variations thereof may be used in various combinations to balance the need to protect the privacy, integrity, and/or availability of stored data with the desire to maintain the illusion that the data has not been adequately protected.

Reference is again made to FIG. 9, which shows a state diagram depicting various states through which protected device 10 might pass. Initial state 90 assumes no honeypot provisioning has taken place yet in the device to be protected. At some point, such honeypot provisioning 901 takes place, and the now-protected device has dormant honeypot capabilities in state 900; it remains in what is normal mode (as opposed to honeypot mode as described herein). If condition C1 is recognized (911), the associated profile P1 is put into effect in state 910. If subsequently the user attempts a security wipe, this is recognized as condition C4 (941), and profile P4 is put into effect in state 940, which remains the case even if an additional security wipe (942) is attempted. If either condition C2 is recognized (921) or condition C3 is recognized (922), the associated profile P2 is put into effect in state 920. If subsequently the user attempts a security wipe, this is recognized as condition C5 (941), and profile P5 is put into effect in state 950, which remains the case even if an additional security wipe (952) is attempted.

Not shown in FIG. 9 is any transition back to normal mode, i.e. state 900. In cases in which protected device 10 has been lost by or stolen from an authorized user, one objective of having the device so protected is to aid in its recovery. Once this had been accomplished, it may be desirable for it to be restored to normal functioning. To provide for this eventuality, provisioning step 300 (FIG. 2) may provide the capability to move back to normal mode upon the device's recognition of a predetermined condition, such as another message from an external device or some predetermined input at the device.

In some embodiments certain usages of protected device 10 will still be authorized for any user, such as choosing a displayed option to report the device as being found or to speed-dial the rightful owner. If such a feature is known to always be present, even in normal mode, such an authorized option does not spoil the ruse that the device is in normal mode. The method and system described herein are not meant to preclude or replace what is currently the most common way rightful owners regain possession of lost electronic devices—honest people who found the devices using the devices and/or information contained therein to contact the owners.

The various embodiments presented above are merely exemplary and are in no way meant to limit the scope of this disclosure. Other variations of the innovations described herein will be apparent to persons of ordinary skill in the art.

What is claimed is:

1. A method for surreptitiously tracking usage of a mobile communication electronic device, the electronic device being capable of communicating with at least one external system, the method comprising:

providing the electronic device with a software environment having a normal mode of operation and a honeypot mode of operation and with a predetermined condition, wherein, in said normal mode of operation, said software environment provides a plurality of user-invokable operations, and wherein, in said honeypot mode of operation, said software environment provides at least one of said user-invokable operations;

detecting, at the electronic device, the predetermined condition, wherein the predetermined condition includes receipt, from an external device, of a message including a honeypot-triggering command;

authenticating the message to verify that the message is a legitimate honeypot-triggering command sent by an authorized sender;

in response to the authentication of the message, switching the software environment to said honeypot mode of operation; and, when in said honeypot mode of operation the electronic device is enabled to automatically and surreptitiously send a usage report regarding an unauthorized usage of said at least one of said user-invokable operations to a predetermined external system.

2. The method of claim 1, wherein the step of providing includes providing the electronic device with the software environment through at least one connection from the following group: a direct, wired connection; a direct, wireless connection; a private network connection; and a virtual private network connection.

3. The method of claim 1, wherein said step of providing includes receiving at the electronic device a communication provisioning the software environment from an external source, authenticating the communication as authorized, and installing the software environment on the electronic device.

4. The method of claim 3, wherein said communication comprises a software update.

5. The method of claim 1, wherein said step of detecting the predetermined condition includes determining that a predetermined state of the electronic device exists.

6. The method of claim 5, wherein said step of determining includes determining that a predefined maximum number of failed password attempts have been made.

7. The method of claim 1, wherein said step of receiving includes authenticating said message.

8. The method of claim 1, wherein said step of switching includes modifying a behaviour of said at least one of said user-invokable operations.

9. The method of claim 1, wherein said step of providing includes providing said at least one user-invokable operation with a normal function and a modified function, and wherein said modified function includes performing a given operation, and wherein the step of switching includes causing said at least one user-invokable operation to switch from said normal function to said modified function.

10. The method of claim 9, wherein said given operation includes generating said report.

11. The method of claim 9, wherein the electronic device is capable of voice communication and said user-invokable operation comprises initiating a voice call, and wherein said modified function comprises at least one of the following:
simulating placing said call;
placing said call both to an intended party and to a predetermined party; and
automatically sending said report, wherein said report includes information regarding said placing said call.

12. The method of claim 9, wherein the electronic device is capable of sending electronic messages and said user-invokable operation comprises initiating a send message operation, and wherein said modified function comprises at least one of the following:
simulating sending a message;
sending the message to an intended recipient and sending a doubly blind carbon copy of the message to a predetermined recipient, with the predetermined recipient excluded from all fields of both the message received by the intended recipient and the sent copy stored on the electronic device;
sending the message only to a predetermined recipient, with the sent copy stored on the electronic device indicating it was sent to the intended recipient rather than the predetermined recipient; and
sending said report regarding said attempt to said predetermined external system.

13. The method of claim 1, wherein said step of switching includes manipulating at least a portion of the stored data, said step of manipulating including at least one of the following steps: encrypting stored data, deleting stored data, sending stored data to a predetermined external device, moving stored data within the memory, storing in the memory data received from a predetermined external device, and changing access permissions associated with stored data.

14. The method of claim 13, wherein said step of encrypting stored data includes use of at least one of the following encryption methods:
the Advance Encryption Standard (AES), and the Triple Data Encryption Algorithm (TDEA).

15. A method for surreptitiously tracking usage of a mobile communication electronic device, the electronic device being capable of communicating with at least one external system, the method comprising:
providing the electronic device with a software environment having a normal mode of operation and a honeypot mode of operation and with a predetermined condition, wherein, in said normal mode of operation, said software environment provides a plurality of user-invokable operations, and wherein, in said honeypot mode of operation, said software environment provides at least one of said user-invokable operations;
detecting, at the electronic device, the predetermined condition, wherein the predetermined condition includes receipt, from an external device, of a message including a honeypot-triggering command;
authenticating the message to verify that the message is a legitimate honeypot-triggering command sent by an authorized sender;
in response to the authentication of the message, switching the software environment to said honeypot mode of operation, wherein said step of switching includes moving data to a portion of memory that is inaccessible to all user-invokable operations while the electronic device is operating in said honeypot mode; and,
when in said honeypot mode of operation the electronic device is enabled to automatically and surreptitiously send a usage report regarding an unauthorized usage of said at least one of said user-invokable operations to a predetermined external system.

16. The method of claim 15, wherein the moving of stored data within the memory has a steganographic effect.

17. The method of claim 1, wherein the electronic device has a user-invokable wipe operation for re-initializing the state of the electronic device, and wherein said step of switching includes storing information regarding said honeypot mode in a persistent portion of stored memory such that said software environment remains in said honeypot mode of operation following invocation of said wipe operation.

18. The method of claim 1, further including detecting usage of said at least one of said user-invokable operations and automatically sending said report regarding said usage.

19. A mobile communication electronic device, configured to enable surreptitious tracking of usage of the electronic device, the electronic device comprising:
a communication subsystem for enabling communications with at least one external system;
memory storing a software environment having a normal mode of operation and a honeypot mode of operation and storing a predetermined condition, wherein, in said normal mode of operation, said software environment provides a plurality of user-invokable operations, and wherein, in said honeypot mode of operation, said software environment provides at least one of said user-invokable operations;
a processor for executing said software environment; and
a mode-switch module for detecting the predetermined condition, wherein the predetermined condition includes receipt, from an external device, of a message including a honeypot-triggering command, authenticating the message to verify that the message is a legitimate honeypot-triggering command sent by an authorized sender, and, in response to the authentication of the message, switching the software environment to said honeypot mode of operation;
wherein, when in said honeypot mode of operation, said software environment is enabled to automatically send a usage report regarding an unauthorized usage of said at least one of said user-invokable operations to a predetermined external system.

20. The electronic device of claim 19, wherein the communication subsystem is adapted to receive a communication from an external source providing said software environment, and wherein the communication subsystem is adapted to establish at least one connection from the following group: a direct, wired connection; a direct, wireless connection; a private network connection; and a virtual private network connection.

21. The electronic device of claim 20, further including an authentication component for authenticating said communication.

22. The electronic device of claim 21, wherein said communication comprises a software update.

23. The electronic device of claim 19, wherein said predetermined condition comprises a device state, and wherein said mode-switch module is adapted to determine that said device state exists.

24. The electronic device of claim 23, said device state includes a state in which a predefined maximum number of failed password attempts have been made.

25. The electronic device of claim 19, wherein said mode-switch module is adapted to authenticate said message.

26. The electronic device of claim 19, said mode-switch module is adapted to modify a behaviour of said at least one of said user-invokable operations.

27. The electronic device of claim 19, wherein said at least one user-invokable operation is configured to have a normal function and a modified function, and wherein said modified function includes a given operation, and wherein said mode-switch module is adapted to cause said at least one user-invokable operation to switch from said normal function to said modified function.

28. The electronic device of claim 27, wherein said given operation includes generating said report.

29. The electronic device of claim 27, wherein the electronic device is capable of voice communication and said at least one user-invokable operation comprises initiating a voice call, and wherein said modified function comprises at least one of the following:
  simulating placing said call;
  placing said call both to an intended party and to a predetermined party; and
  automatically sending said report, wherein said report includes information regarding said placing said call.

30. The electronic device of claim 27, wherein the electronic device is capable of sending electronic messages and said at least one user-invokable operation comprises initiating a send-message operation, and wherein said modified function comprises at least one of the following:
  simulating sending a message;
  sending the message to an intended recipient and sending a doubly blind carbon copy of the message to a predetermined recipient, with the predetermined recipient excluded from all fields of both the message received by the intended recipient and the sent copy stored on the electronic device;
  sending the message only to a predetermined recipient, with the sent copy stored on the electronic device indicating it was sent to the intended recipient rather than the predetermined recipient; and
  sending a report of said attempt to said predetermined external system.

31. The electronic device of claim 19, wherein said mode-switch module includes a component for manipulating at least a portion of the stored data, wherein said component is adapted to perform at least one of the following operations: encrypting stored data, deleting stored data, sending stored data to a predetermined external device, moving stored data within the memory, storing in the memory data received from a predetermined external device, and changing access permissions associated with stored data.

32. A mobile communication electronic device, configured to enable surreptitious tracking of usage of the electronic device, the electronic device comprising:
  a communication subsystem for enabling communications with at least one external system;
  memory storing a software environment having a normal mode of operation and a honeypot mode of operation and storing a predetermined condition, wherein, in said normal mode of operation, said software environment provides a plurality of user-invokable operations, and wherein, in said honeypot mode of operation, said software environment provides at least one of said user-invokable operations;
  a processor for executing said software environment; and
  a mode-switch module for detecting the predetermined condition, wherein the predetermined condition includes receipt, from an external device, of a message including a honeypot-triggering command, authenticating the message to verify that the message is a legitimate honeypot-triggering command sent by an authorized sender and, in response to the authentication of the message, switching the software environment to said honeypot mode of operation;
  wherein, when in said honeypot mode of operation, said software environment is enabled to automatically and surreptitiously send a usage report regarding an unauthorized usage of said at least one of said user-invokable operations to a predetermined external system;
  wherein said step of switching includes moving data to a portion of memory that is inaccessible to all user-invokable operations while the electronic device is operating in said honeypot mode;
  wherein the moving of data comprises moving data to a portion of memory that is inaccessible to all user-invokable operations while the electronic device is operating in said honeypot mode.

33. The electronic device of claim 32, wherein the moving of stored data within the memory has a steganographic effect.

34. The electronic device of claim 19, wherein the electronic device includes a user-invokable wipe operation for re-initializing the state of the electronic device, and wherein said mode-switch module stores information regarding said honeypot mode in a persistent portion of stored memory such that said software environment remains in said honeypot mode of operation following invocation of said wipe operation.

35. A computer program product comprising a non-transitory computer-readable medium having encoded therein computer-executable instructions for surreptitiously tracking usage of a mobile communication electronic device, the electronic device being capable of communicating with at least one external system, the instructions comprising:
  instructions for providing the electronic device with a software environment having a normal mode of operation and a honeypot mode of operation and with a predetermined condition, wherein, in said normal mode of operation, said software environment provides a plurality of user-invokable operations, and wherein, in said honeypot mode of operation, said software environment provides at least one of said user-invokable operations;
  instructions for detecting, at the electronic device, the predetermined condition, wherein the predetermined condition includes receipt, from an external device, of a message including a honeypot-triggering command;
  instructions for authenticating the message to verify that the message is a legitimate honeypot-triggering command sent by an authorized sender;

instructions for, in response to the authentication of the message, switching the software environment to said honeypot mode of operation; and instructions for, when in said honeypot mode of operation, automatically and surreptitiously sending a usage report regarding an unauthorized usage of said at least one of said user-invokable operations to a predetermined external system.

* * * * *